Sept. 3, 1957 C. H. JUDISCH 2,804,647
AUTOMATIC COIL WINDING APPARATUS
Filed Aug. 20, 1953 3 Sheets-Sheet 1
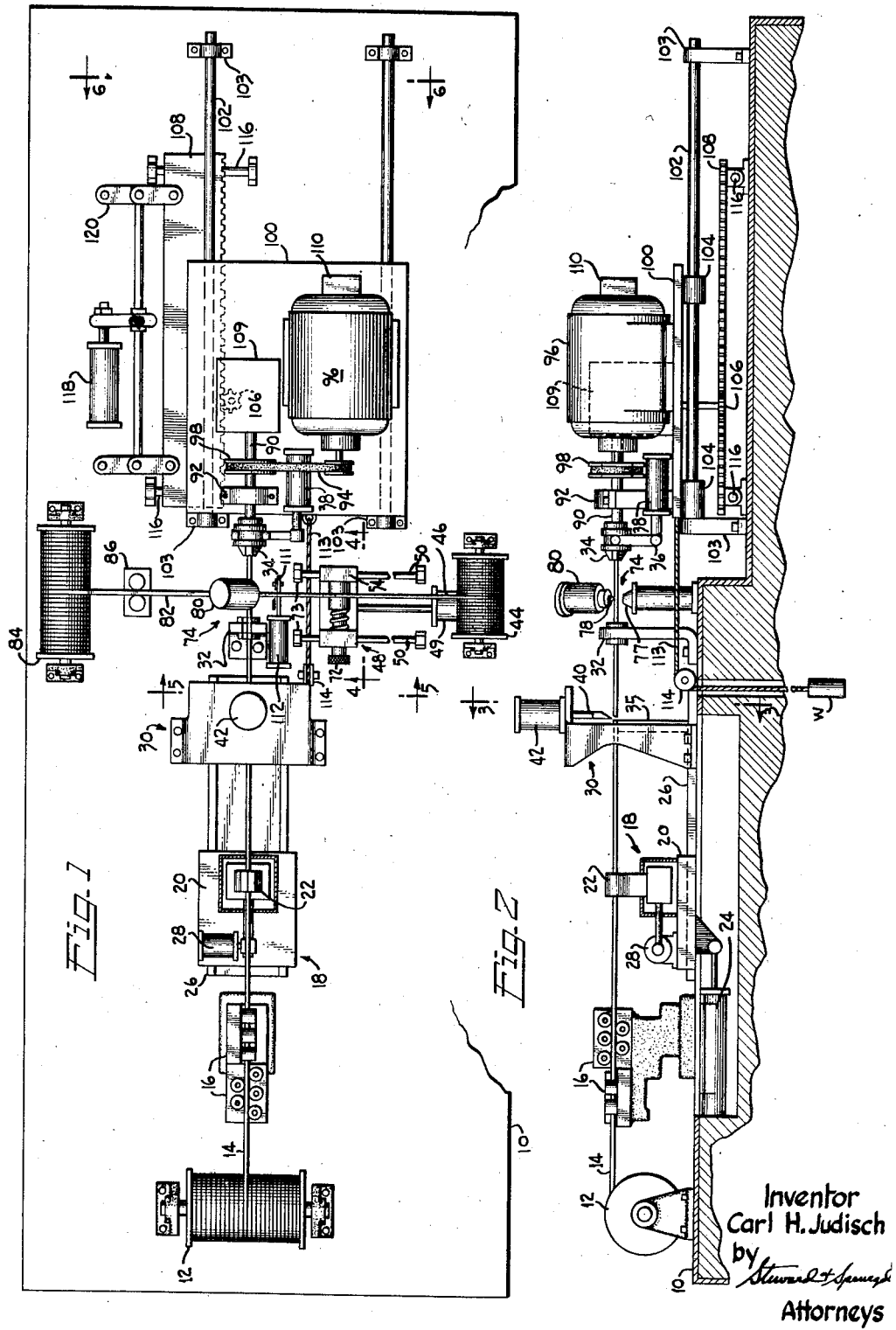
Inventor
Carl H. Judisch
by
Attorneys

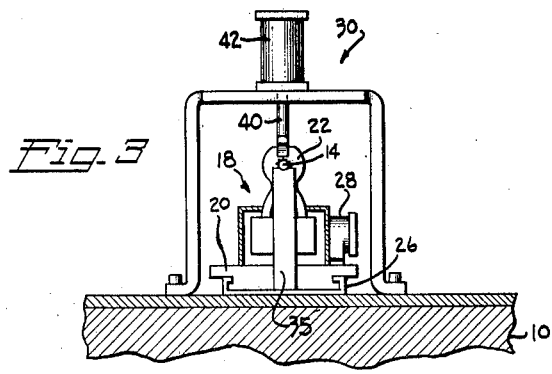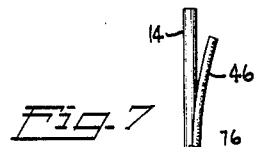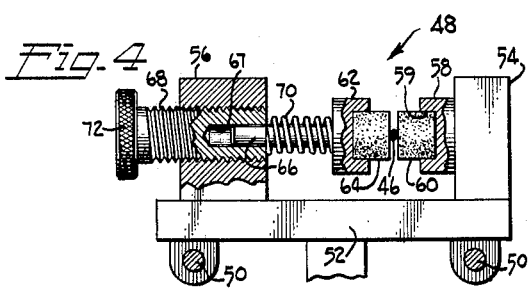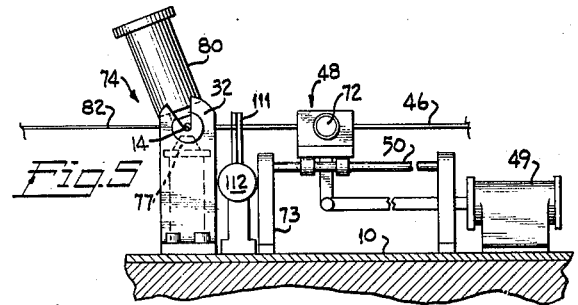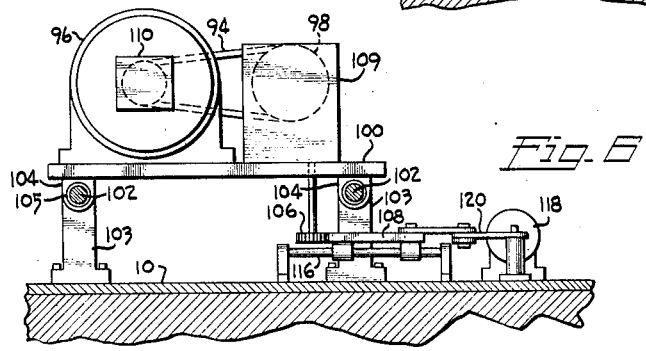

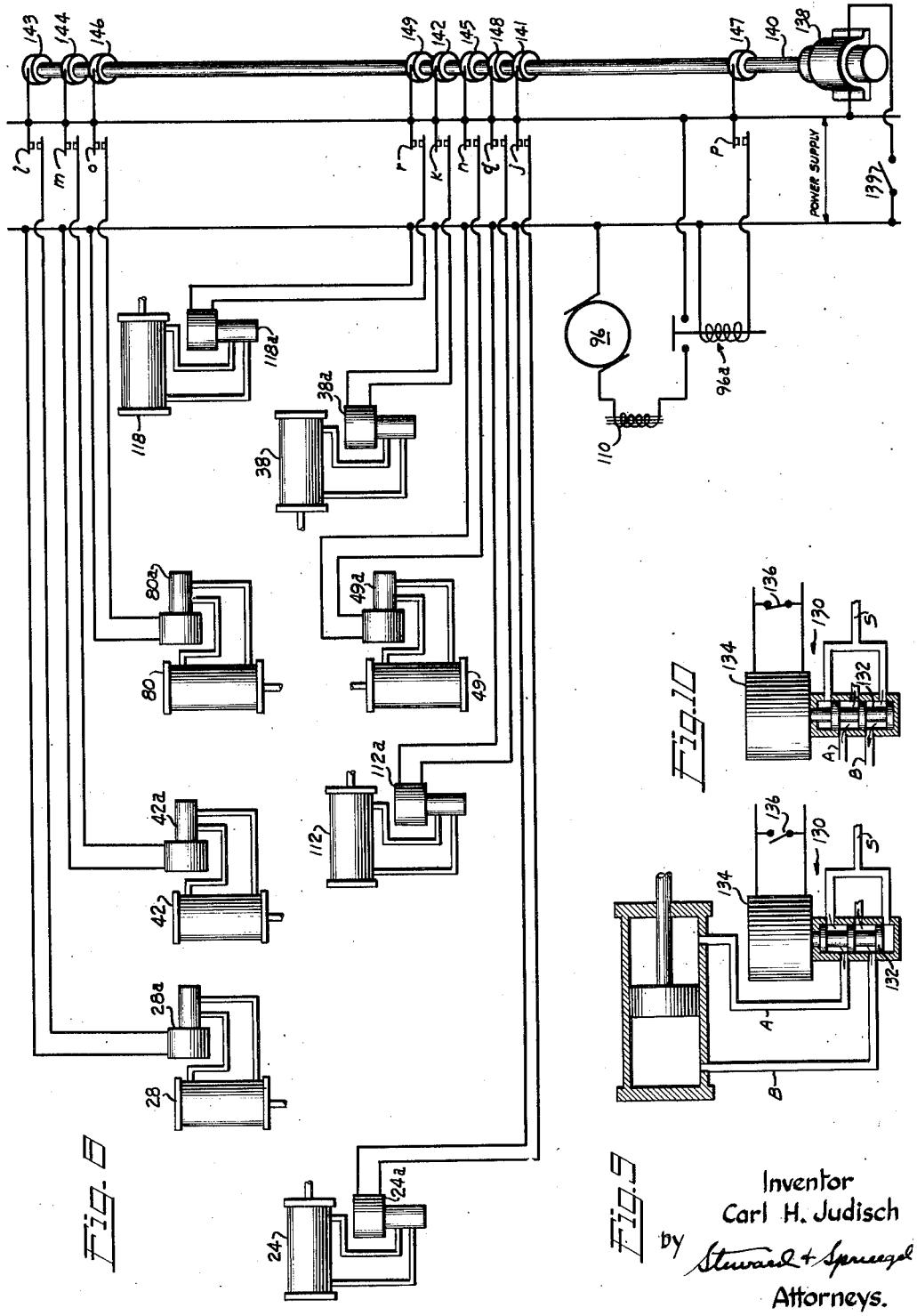

A United States Patent Office 2,804,647
Patented Sept. 3, 1957

2,804,647

AUTOMATIC COIL WINDING APPARATUS

Carl H. Judisch, Hamden, Conn., assignor to The Whitney Blake Company, Hamden, Conn., a corporation of Connecticut Application August 20, 1953, Serial No. 375,443

9 Claims. (Cl. 18—19)

This invention relates to coil winding apparatus and has particular reference to novel automatic coil winding apparatus for winding electrically conductive cord or similar materials into tight helical coils.

Retracting or extensible cord having a coating or otherwise including a material which is settable to elastic condition is being manufactured for various purposes, and the process of forming this type of cord by winding it into a helical coil and heat treating the coil to give it a permanent set is now well-known in the art. However, while many different methods are practiced in carrying out the coil winding operation, most of them are accomplished largely by manual operation or by machinery that is only semi-automatic. This, of course, is expensive and time-consuming and frequently results in a non-uniform end-product. Attempts to remedy this situation by providing fully automatic machinery to perform the operation have generally resulted in apparatus too complicated and expensive to accomplish the task efficiently.

The primary purpose of the present invention, therefore, is to provide a fully automatic coil winding apparatus which is relatively inexpensive to manufacture and operate, and which performs the winding operation quickly and uniformly under all conditions. A further purpose of the invention is to provide a novel method of producing uniformly wound retractile or extensible cords.

While the invention will hereinafter be described in connection with the winding of rubber covered cord, it should be understood that it will operate equally well with many types of material of relatively small cross section that are intended to be wound into helical coils. At the present time there is a large demand and numerous uses for retractile conducting cords of various types. One of the most important of these uses is for factory assembly lines where a large number of electrical tools may be mounted in close proximity and where it is desirable to avoid the entanglement of long electric cords. Another important use and perhaps the most obvious is for telephone cords. Retractile cords are also used for household appliances such as vacuum cleaners, and in short for any appliance or machine requiring a long electric cord. Apart from electric cords, the invention disclosed herein can be used to wind materials such as strips or ribbons of thermoplastic, strips of cardboard, non-conductive rubber coated cord, steel wire or, as pointed out hereinabove almost anything capable of being wound into helical coils whether or not it is intended to be made retractible and expansible.

With the foregoing and other considerations in view, it is a primary object of this invention to provide a fully automatic coil winding apparatus.

Another important object of the invention is to provide an automatic coil winding apparatus that is comparatively inexpensive to manufacture and operate.

Still another object of the invention is to provide an automatic coil winding apparatus that is compact in size and which may be bench mounted for convenience.

A further important object of the invention is to provide a simple, high speed method of producing uniformly wound retractile cords.

In general, the coil winding apparatus of this invention rotates a mandrel to which is fastened one end of a cord which is to be formed into a helical coil. As the mandrel is rotated and the cord is fed onto the mandrel, the latter is moved axially at a rate coordinated with the speed of rotation to produce the desired helical turns of the cord on the mandrel. After a predetermined length of cord has been wound onto the mandrel, the other end of the cord is fastened to the mandrel, and both cord and mandrel are ejected from the machine for subsequent processing of the cord as, for instance, by heat treatment to give it a permanent set as coiled. The whole winding process is carried out automatically by machine, thereby greatly increasing the number of cords which may be completely wound during a given period of time and making it possible for one operator to attend two or more machines at once.

Other objects and advantages will become apparent from the following detailed description read in conjunction with the accompanying drawings, and from the appended claims. The accompanying drawings, in which like reference numerals are used to designate similar parts throughout, illustrate a particularly desirable embodiment for the purpose of disclosing the invention. The drawings, however, are not to be taken in a limiting or restrictive sense since it will be apparent to those skilled in the art that various changes in the illustrated construction may be resorted to without in any way going beyond the scope of the invention.

In the drawings, which for the most part are schematic:

Fig. 1 is a plan view of one practical embodiment of the automatic coil winding apparatus of the invention;

Fig. 2 is a side elevation of the apparatus shown in Fig. 1 with certain parts omitted for clarity;

Fig. 3 is an end elevation of a portion of the apparatus taken in the direction of line 3—3 of Fig. 2;

Fig. 4 is an enlarged side elevation of the cord feeding and tensioning device taken on line 4—4 of Fig. 1, with certain parts broken away;

Fig. 5 is an enlarged section taken in the direction of line 5—5 of Fig. 1;

Fig. 6 is an end elevation of the chuck and motor carriage taken along line 6—6 of Fig. 1;

Fig. 7 is a coil which is shown fully wound upon a mandrel by the apparatus of Figs. 1-6;

Fig. 8 is a wiring diagram of an electrical control system for the apparatus illustrated in Figs. 1-6;

Fig. 9 is a schematic illustration of a typical air supply system for each of the various air cylinders used for operation of the coil winding apparatus; and Fig. 10 shows the control valve illustrated in Fig. 9 in a different position for reversing the flow of air to the cylinder.

Referring now to the drawings, the apparatus of the invention is mounted upon a bench or table 10 which rotatably supports at one end thereof a supply reel 12 from which the wire 14 to form mandrels is paid out. Wire 14 passes through conventional wire straighteners 16 and through a feeding device generally indicated at 18. Cold drawn steel is best suited for mandrels formed from wire stock because it provides the necessary stiffness for the purpose and because it may be readily straightened as it is fed from a reel. It should be mentioned at this point that when the coils are to be of small diameter the mandrels must be of small diameter, and the mandrel stock can be supplied in reel form as shown in the drawings. However, when the coil is to be of larger diameter and consequently the mandrels must be larger, they will be supplied in pre-cut form to the feeding device 18 from a conventional hopper feeder, not shown.

Feeding or mandrel-delivering device 18 comprises a reciprocable carriage 20 supporting a clamp 22. Carriage 20 is reciprocated by means of a conventional solenoid valve controlled air cylinder motor 24, Fig. 2, upon tracks 26, Figs. 1, 2 and 3, suitably secured to bench 10. The clamp 22 is opened and closed by another air cylinder 28 mounted on carriage 20, and in its closed position firmly grips wire 14 so that when carriage 20 moves to the right as viewed in Fig. 2 the wire is passed through a cutter generally indicated at 30 and a guide 32, and is delivered into the open jaws of a conventional power-operated chuck 34. Guide 32 holds the outer end of the mandrel during the winding operation and may have an open top as shown in Fig. 5 to facilitate removal of the mandrel therefrom after the cord has been wound.

It will be noted from Fig. 3 that the supporting structure of cutter 30 is in the form of an archway to permit the passage of carriage 20 therethrough sufficiently far to insert the end of the wire into the jaws of the chuck. Chuck 34 may be provided with a spring loaded ejector (not shown) for ejecting the mandrel therefrom upon completion of the winding operation as will be more apparent hereinafter. In this case the mandrel wire 14 is pressed against the spring loaded ejector as it is inserted into the chuck. Movement of the carriage 20 to the right as shown in the drawings is arrested by an abutment 35 at the end of tracks 26, abutment 35 being so positioned that the carriage 20 stops just as the end of wire 14 is inserted into the jaws of chuck 34 and into engagement with the ejector. The chuck jaws are then closed upon the wire 14 by means of an eccentric cam 36 operated by an air cylinder 38, Fig. 2. Upon the closing of the chuck jaws, the jaws of clamp 22 are opened and its carriage 20 is returned to its starting position to the left in Fig. 2. As illustrated in the drawings, abutment 35 extends upwardly so that its upper end acts as a support for the mandrel wire 14 when the mandrel is cut by cutter 30. After carriage 20 has returned to its left hand position, the jaws of clamp 22 are again closed on the wire 14 and the shearing blade 40 of the cutter 30 is actuated by an air cylinder 42 to cut the wire adjacent the upper end of abutment 35. The wire to the left of the cutter is then supported by clamp 22, while the severed piece of wire to the right of the cutter, which will serve as the mandrel, is supported by the guide 32 and chuck 34. The purpose of closing clamp 22 on wire 14 before actuating the cutter 30 is to prevent the wire from slipping back on its reel and also to hold the wire in readiness for the start of the next cycle of operations. The wire, of course, is always of sufficient diameter so that it will extend rigidly from its supports as shown in the drawings.

The cord or other material to be coiled upon the mandrel is paid out from a reel 44 rotatably supported on the bench 10. The cord 46 is passed through a feeding and tensioning device, generally indicated at 48, which serves to position the free end of the cord over each new mandrel so that it may be coiled thereupon. The feeding and tensioning device 48, Figs. 1, 4 and 5, is mounted for reciprocable movement on rods or tracks 50 suitably secured to bench 10, and is actuated in this movement by a conventional air cylinder 49. As best seen from Fig. 4 the feeding and tensioning device 48 comprises a base 52 formed with a pair of upstanding support members 54 and 56. Secured to, or integrally formed with, support 54 is a metal block 58 formed with a recess 59 to receive a portion of a gripping block 60 of some suitable material as leather. Adjacent and opposed to blocks 58 and 60 are a similar arrangement of blocks 62 and 64, block 62 being supported by a stud shaft 66. Shaft 66 extends into the smooth bore 67 of a cylinder 68 threaded into support member 56. Positioned between block 62 and cylinder 68 on shaft 66 is a compression spring 70 which urges block 64 towards block 60 causing cord 46 to be gripped therebetween. Cylinder 68 is provided with a knurled knob 72 at its outer end so that the grip on cord 46 may be tightened or relaxed as necessary.

Feeding and tensioning device 48 is normally at the end of its tracks 50 away from chuck 34 but after wire 14 has been cut by cutter 30 or during this cutting operation, the device is moved towards the mandrel until its base 52 comes up against the supports 73 at the ends of tracks 50. At this point an end of cord 46 is positioned over the mandrel, and a fastening device shown diagrammatically at 74 fastens the cord to the mandrel by means of a metal clip 76 as shown in Fig. 7. The fastener may comprise a fixed lower die 77 and a reciprocable upper die 78 actuated by an air cylinder 80, Figs. 2 and 5. The fastening wire or metal band 82 for forming clips 76 is fed from a reel 84 rotatably supported on bench 10 and is fed and guided into fastener 74 by means of a feeding device, diagrammatically indicated at 86, which may be similar to cord feeding and tensioning device 48 or may be of any other suitable design. Fastener 74 is provided with means for cutting the fastening wire 82 after a clip has been formed.

When the end of cord 46 has been clipped to the mandrel, chuck 34 starts to rotate and at the same time to move to the right as shown in Fig. 1 so that the cord is wound upon the mandrel clamped in the chuck. In this operation the speed of rotation and speed of longitudinal movement of the chuck 34 are so timed and coordinated as to cause cord 46 to be wound in a tight helical coil about the mandrel. Chuck 34 has a shaft 90 rotatably supported in a bracket 92, and is driven by means of a belt connection 94 between a suitable electric motor 96 and a pulley 98 secured to shaft 90. Motor 96 and bracket 92 are supported on a carriage 100 mounted for reciprocable movement on suitable supports such as rods 102 mounted by supports 103 on bench 10. The underside of the carriage, Fig. 6, is provided with two pairs of castings 104 into which are fitted linear-motion ball bushings 105 through which the rods 102 pass. Carriage 100 is moved to the right, as viewed in Figs. 1 and 2, by means of a pinion gear 106, Figs. 1 and 6, which meshes with a rack 108. Pinion 106 is driven by motor 96 through an extension of shaft 90 and a speed reduction unit 109. After a few turns of the cord 46 have been wound upon the mandrel to avoid any chance of the cord pulling free from the mandrel, the feeding and tensioning device 48 is moved away from the mandrel while the rotating mandrel continues to draw the cord through it.

In order that each coil will be of uniform length, motor 96 is provided with a solenoid operated brake 110 which immediately stops the rotation of the motor armature and hence of chuck 34 whenever power is taken off the motor. When a coil of the desired length has been wound the motor 96 is then shut off causing the rotation of the chuck and rightward traverse of carriage 100 to stop. At this point, fastener 74 is again actuated to clip the trailing or after end of cord 46 to the mandrel and cutter, diagrammatically illustrated in Fig. 1 at 111, is actuated to cut the cord. Fig. 5 shows in somewhat more detail the cutter 111, which is operated by means of an air cylinder 112.

Since the feeding and tensioning device 48 is at this time at the end of its tracks or away from the mandrel, there will be a projecting end of the cord 46 so that when the device again moves toward the mandrel this end will extend over the mandrel in proper position to be fastened thereto. After cord 46 has been cut the chuck jaws are opened permitting the mandrel with the cord wound thereon to be ejected from the chuck by the spring loaded ejector in the chuck and to drop into a suitable hopper, not shown, positioned below the bench 10. As soon as the mandrel and wound cord have been ejected rack 108 is disengaged from pinion 106 and carriage 100 is returned to its normal or starting position to the left by means of a cable 113 which passes over a pulley 114 and has a suitable weight W secured to its free end, carriage 100 being stopped at its starting position by engagement of its forward castings 104 with track supports 103. This arrangement ensures a rapid return of the carriage for the start of the next cycle of operations. As may be best seen from Figs. 1 and 6, rack 108 is mounted for reciprocable movement upon rods 116, and is engaged with and disengaged from pinion 106 by means of an air cylinder 118 which is mounted on the bench 10 and which actuates the rack through a pair of toggle linkages 119 and 120.

It will be noted from Fig. 2 that the length of wire 14 between the feed clamp 22 in its initial position and cutter 30 where the wire was previously cut is sufficiently long so that movement of the carriage 20 to the right through the cutter will cause this projecting length to extend into the open jaws of chuck 34 so that the coil winding operations can be carried out as hereinabove described. Although the mandrel feeding device and cutter, cord feeding and cutting devices, cord fastening device, and carriage-rack engaging apparatus are all described as being operated by air cylinders, it is of course readily apparent that these parts may, if desired, be operated hydraulically or mechanically by levers or cams.

Each cycle of operations and the timing of the individual operating steps is carried out by conventional electrical means as shown in Fig. 8 in which each air cylinder for driving the various parts of the apparatus is controlled by a three-way solenoid operated valve diagrammatically illustrated in Figs. 9 and 10.

With reference to Fig. 9, the solenoid operated valve indicated generally at 130 is in this instance of the spring-loaded type in which a spring (not shown) urges a valve 132 upwardly to permit flow of air from a compressed air supply line S to an air line A leading to one side of the air cylinder to move the piston in one direction. Air line B leading from the other side of the air cylinder is vented to the atmosphere when the valve is in the position shown in Fig. 9. Upon energizing the coil of a solenoid 134 by closing switch 136, the valve 132 is moved downwardly reversing the flow of air as shown in Fig. 10 and causing the air cylinder to be actuated in the opposite direction.

The cycle of operations of the coil winding apparatus hereinbefore disclosed is controlled by a motor driven cam arrangement which causes the switches in the circuits for energizing the various control valves to be opened and closed in a predetermined sequence to be described. Cycling motor 138 (Fig. 8) is connected to an electrical power supply through a starting switch 139 and drives a cam shaft 140 on which are secured a plurality of cams 141—149, each arranged to open and close one of a group of switches j to r at the proper times to actuate the abovementioned solenoid operated valves. Assuming that the cord winding apparatus is ready for a mandrel to be fed into the chuck with the mandrel delivering device 18 at its starting position, with the cord feeding and tensioning device 48 in its normal position away from the chuck 34 and with the carriage 100 in its starting position with the rack 108 engaging pinion 106, the solenoid operated valves controlling the various air cylinders are arranged so that none of their solenoids are energized at this point and motor 96 is stopped. Consequently, all of the cam operated switches are open as shown in Fig. 8. It will be noted that the cam operated switches j to r of Fig. 8 correspond to the switch 136 of the detail shown in Figs. 9 and 10.

The operator now throws the starting switch 139 which starts the cycling motor 138 and rotates the cam shaft 140 through suitable speed reduction means. This causes cam 141 to close switch j, completing the circuit to the valve 24a which reverses the direction of the air supplied to cylinder 24 causing it to feed the mandrel to the chuck 34 as hereinbefore described. Upon insertion of the end of the mandrel into the jaws of the chuck, the feed carriage 20 becomes up against the abutment 35 (Fig. 2) in order to prevent further motion of the mandrel in this direction, whereupon cam 142 causes switch k to close energizing the solenoid in valve 38a, which actuates cylinder 38 and closes the jaws of the chuck 34 on the end of the delivered mandrel. Switch l is now closed by means of cam 143 operating valve 28a to cause cylinder 28 to open clamp 22 of the mandrel feeding device 18, after which switch j is permitted to open, thereby returning valve 24a to its initial position so that cylinder 24 is reversed and returns the mandrel feeding device to its starting position. Switch l then opens permitting valve 28a to reverse cylinder 28 to again close the clamp 22 and to hold the mandrel wire 14, during the rest of the cycle of operations.

After the clamp 22 again grips the mandrel wire 14, a cam 144 closes switch m to operate valve 42a which causes cylinder 42 to actuate the shearing blade 40 of cutter 30 to cut the wire 14. Switch m is then immediately opened as soon as the mandrel wire is cut. In the meantime, switch n has been closed by cam 145 closing the circuit to valve 49a of cylinder 49 so that the cord feeding and tensioning device 48 is moved toward the mandrel positioning the end of cord 46 over the mandrel, at which point the feeding and tensioning device is stopped by the abutment 73 (Fig. 5). A switch o is then closed by cam 146 long enough to operate cylinder 80 of the fastening device 74 to clip the end of cord 46 to the mandrel.

Cam 147 now closes the switch p energizing the coil in a solenoid operated switch 96a to complete the circuit supplying power to the motor 96, thereby starting the motor and at the same time releasing the motor brake by energizing the solenoid 110 shown in series in the motor circuit. After a few revolutions of the mandrel, switch n in the circuit to the cylinder 49 of the cord feeding and tensioning device 48 is opened, reversing the operation of cylinder 49 to withdraw device 48 from the mandrel to its starting position. When the desired length of cord has been wound onto the mandrel, switch p is opened, stopping the motor 96. Cam 146 again closes switch o long enough to energize valve 80a and to operate cylinder 80 of fastening device 74 to clip the trailing end of cord 46 to the mandrel. Cam 148 then closes switch q long enough to operate the cord cutting device 111 by means of cylinder 112, which is actuated through operation of valve 112a.

As soon as cord 46 has been cut freeing it from the mandrel and cord wound thereon, switch k in the circuit controlling the operation of the jaws of chuck 34 is opened releasing the mandrel and permitting its ejection from the chuck. The carriage 100, having been moved to the right by gear 106 and rack 108, is then returned to its starting position by unlocking the rack 108 from the pinion 106 in the manner hereinbefore described. Actuation of cylinder 118 is brought about by cam 149 closing a switch r energizing valve 118a which reverses the operation of cylinder 118 causing the rack 108 to be disengaged from pinion 106 and permitting the carriage 100 to be quickly returned to its starting position by weight W. Switch r in the circuit controlling cylinder 118 is then opened again by cam 149, locking the rack 108 with pinion 106 and completing the cycle of operations. It will be noted that at this point all the switches controlling the solenoid operated valves are again open and that the various operating parts of the machine are in proper position to start a new cycle of operations. The cycle will be repeated over and over again so long as the main starting switch 139 remains closed.

The coils produced as hereinabove described are ordinarily removed from the collection hopper and vulcanized or otherwise heat treated while still fastened to their mandrels. After the coils have thus acquired a permanent set, the finished coils are removed from their mandrels.

From the foregoing description it will be apparent that the present invention provides a relatively simple yet highly efficient automatic coil winding apparatus capable of coiling a wide variety of materials into uniform, tightly wound coils. In addition, the apparatus is compact, and of simple construction so that any necessary repairs or replacement of its elements can be easily and quickly accomplished. The specific embodiment of the invention herein disclosed employs apparatus in which the mandrel is moved longitudinally while it is being rotated in order to wind the cord in smooth even turns along the mandrel. It is of course clearly within the scope of this invention to fix the mandrel longitudinally and to move the cord feeding means parallel to the axis of rotation of the mandrel. This can be readily accomplished by fixing the chuck 34 on table 10 and by mounting the cord feeding and tensioning device 48 and the fastening means 74 on a carriage which is capable of reciprocable movement in a direction perpendicular to the movement of the cord feeding device 48. This carriage could be actuated by means of any suitable source of power and would of course be coordinated with the rotation of the mandrel as in the specific embodiment of the invention hereinbefore disclosed.

The invention may be carried out in other specific ways than that herein set forth without departing from the spirit and essential characteristics of the invention, and the present embodiment is, therefore, to be considered in all respects as illustrative and not restrictive, and all changes coming within the meaning and equivalency range of the appended claims are intended to be embraced therein.

What is claimed is:

1. An automatic coil winding apparatus comprising a chuck to rigidly support one end of a mandrel, reciprocable feeding means to deliver a mandrel to said chuck, a second reciprocable feeding means to position an end of material to be coiled adjacent the chuck-supported mandrel, fastening means to secure said material to the mandrel, means to rotate said chuck to wind said material onto said mandrel and means to cause relative motion between said mandrel and said second feeding means longitudinally of said mandrel, whereby said material is helically wound on the mandrel.

2. An apparatus as defined in claim 1 wherein, said first-named reciprocable feeding means comprises a movable carriage and a mandrel clamping device mounted on said carriage.

3. An apparatus as defined in claim 1 wherein, said second reciprocable feeding means comprises a movable carriage and a wire tensioning and guiding device mounted on said carriage.

4. In an automatic coil winding apparatus, a reciprocable carriage, a chuck rotatably mounted on said carriage to rigidly support a mandrel, reciprocable feeding means to deliver a mandrel to said chuck, a second reciprocable feeding means to position an end of material to be coiled adjacent the chuck-supported mandrel, fastening means to secure said material to the mandrel, means on said carriage to rotate said chuck, and means to move said carriage longitudinally while said chuck is rotating to cause said material to be wound around the mandrel in a helical coil.

5. An automatic coil winding apparatus as defined in claim 4 wherein said means to move said carriage longitudinally comprises a rack member and a motor-driven pinion in engagement with said rack member.

6. An automatic coil winding device as defined in claim 5, including means to disengage said rack member from said pinion when a coil has been wound, and weight operated means to return said carriage to its starting position.

7. In an automatic coil winding apparatus, a chuck member, a reel of continuous mandrel stock, means to deliver one end of said stock to said chuck member, means to cut said stock at a predetermined distance from said chuck member to form a mandrel supported by the chuck member, a reel of continuous material to be coiled, means to position one end of said material adjacent said mandrel, fastening means to secure said material to said mandrel, and means to simultaneously rotate and axially move said chuck to cause said material to be helically wound about said mandrel.

8. In an automatic coil winding apparatus, a reciprocable carriage, a chuck rotatably mounted on said carriage, a reel of continuous mandrel stock, wire straighteners through which the free end of said stock is passed, reciprocable means to deliver the free end of stock projecting from said straighteners to said chuck, means to cause said chuck to grip said free end, means to cut said stock at a predetermined distance from said chuck to form a mandrel supported by the chuck, a reel providing a continuous supply of material to be coiled, reciprocable means to position the free end of said material in contact with said mandrel, fastening means, means to actuate said fastening means to fasten said material to said mandrel, means on said carriage to rotate said chuck, power means to move said carriage longitudinally while said chuck is rotating to cause said material to be helically wound about said mandrel, means to cut said material between its supply reel and said mandrel, means to cause said chuck to eject said mandrel and material wound thereon, and weight operated means to return said carriage to its starting position.

9. In an automatic coil winding apparatus, a chuck member, a reel providing a continuous supply of mandrel stock, a reciprocable carriage, a clamp on said carriage, means to open and close said clamp on said stock, means to move said carriage in one direction to position the free end of said stock in said chuck and in the opposite direction to return said carriage to its starting position, means to actuate said chuck to grip said free end, means to cut said stock between said chuck and said carriage to form a mandrel supported by the chuck, means to position an end of material to be coiled adjacent said mandrel, means to fasten said material to said mandrel, and means to simultaneously rotate and axially move said chuck to cause said material to be wound about said mandrel.

References Cited in the file of this patent

UNITED STATES PATENTS

| | | |
|---|---|---|
| 923,563 | McCornack | June 1, 1909 |
| 1,807,869 | Okey | June 2, 1931 |
| 2,145,439 | Torrence | Jan. 31, 1939 |
| 2,218,995 | Torrence | Oct. 22, 1940 |
| 2,227,602 | Platt | Jan. 7, 1941 |
| 2,287,460 | Wogenhals et al. | Jan. 23, 1942 |
| 2,452,434 | Crehan et al. | Oct. 26, 1948 |
| 2,565,465 | Ames | Aug. 28, 1951 |